United States Patent
Matoba et al.

(10) Patent No.: US 7,059,722 B2
(45) Date of Patent: Jun. 13, 2006

(54) PROJECTOR, NETWORK SYSTEM INCLUDING PROJECTOR, AND METHOD OF CONTROLLING PROJECTOR ON NETWORK SYSTEM

(75) Inventors: Kazuaki Matoba, Tokyo (JP); Junichi Nose, Tokyo (JP); Junji Tada, Tokyo (JP); Kouhei Tamano, Tokyo (JP); Katsumi Asakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 619 days.

(21) Appl. No.: 10/006,585

(22) Filed: Dec. 10, 2001

(65) Prior Publication Data

US 2002/0113952 A1  Aug. 22, 2002

(30) Foreign Application Priority Data

| Jan. 19, 2001 | (JP) | ............................. 2001-010942 |
| Jun. 1, 2001 | (JP) | ............................. 2001-166493 |
| Jan. 22, 2006 | (JP) | ............................. 2001-012656 |

(51) Int. Cl.
G03B 21/26 (2006.01)
G03B 21/14 (2006.01)
G03B 21/22 (2006.01)
H04N 7/14 (2006.01)

(52) U.S. Cl. .................. 353/30; 353/119; 353/122; 348/14.01; 348/14.03

(58) Field of Classification Search ............ 353/30, 353/122, 119; 348/14.01, 14.03
See application file for complete search history.

(56) References Cited

U.S. PATENT DOCUMENTS 4,568,161 A   2/1986   DiGianfilippo et al. ....... 353/25

| 4,734,779 A * | 3/1988 | Levis et al. ................. 348/383 |
| 6,577,080 B1 * | 6/2003 | Lys et al. .................... 315/362 |
| 6,693,661 B1 * | 2/2004 | Vanderwilt et al. ...... 348/14.01 |
| 2003/0117587 A1 * | 6/2003 | Olson et al. ................. 353/30 |

FOREIGN PATENT DOCUMENTS

| EP | 1 096 366 A2 | 5/2001 |
| GB | 2288474 A | 10/1995 |
| JP | 5-289046 A | 11/1993 |
| JP | 8-2788810 A | 10/1996 |
| JP | 10-214070 A | 8/1998 |
| JP | 2000-003236 A | 1/2000 |
| JP | 2000-23150 A | 1/2000 |
| JP | 2000-163168 A | 6/2000 |
| JP | 2000-187536 A | 7/2000 |
| JP | 2000-242377 A | 9/2000 |

(Continued)

OTHER PUBLICATIONS

Patent Abstracts of Japan, vol. 2000, No. 04, Aug. 31, 2000 & JP 2000 023149 A.

(Continued)

Primary Examiner—Melissa Jan Koval
(74) Attorney, Agent, or Firm—Birch, Stewart, Kolasch & Birch, LLP

(57) ABSTRACT

A projector comprises an optical engine which projects an image based on a video signal; a circuit section which controls operation of the optical engine; a power source which supplies electric power to the circuit section; a network interface, through which the circuit section communicates with a remote network terminal device; and a hub which is connected to the network interface and includes a plurality of ports. The network interface communicates with the remote network terminal device through one of the ports of the hub. Further, the power source of the projector supplies electric power to the hub.

5 Claims, 17 Drawing Sheets

FOREIGN PATENT DOCUMENTS

| | | |
|---|---|---|
| JP | 2000-284853 A | 10/2000 |
| JP | 2000-347576 A | 12/2000 |
| JP | 2002-034022 A | 1/2002 |
| WO | WO-99/26131 A1 | 5/1999 |

OTHER PUBLICATIONS

Patent Abstracts of Japan, vol. 1999, No. 02, Feb. 26, 1999 & JP 10 301547 A.

* cited by examiner

PROJECTOR, NETWORK SYSTEM INCLUDING PROJECTOR, AND METHOD OF CONTROLLING PROJECTOR ON NETWORK SYSTEM

BACKGROUND OF THE INVENTION

The present invention relates to a projector, such as a liquid crystal projector and a digital micromirror device (DMD) projector, that projects an image based on a video signal on a screen, a network system including a projector, and a method of controlling a projector on a network system.

A projector is capable of displaying a large image, so it is frequently used for a presentation in a conference, a meeting for reading research papers, a new product announcement, and the like. Further, a projector is often used to display an image based on a signal sent from a personal computer (PC) recently. For instance, Japanese Patent Kokai (laid-open) Publication No. 05-289046 discloses a system including one projector and two PCs that are connected to each other through a cable, wherein the projector is capable of displaying an image based on a signal sent from the PCs.

However, there are many users of projectors who are not acquainted with a network system, so it is difficult for them to construct a network system.

For instance, procedures for constructing a network system include (a) preparing a hub for star-connecting network terminal devices such as a PC and the like, (b) inserting a power cable plug of the hub into an AC wall socket, (c) connecting the projector with the hub using a communication cable (for instance, a LAN cable), and (d) connecting PCs (including a presenter's PC and audiences' PCs) with the hub using a communication cable (for instance, a LAN cable). These must be done at the users' (i.e., presenters' and audiences') first visited place (for example, on a platform of a hall or a conference room of a customer's company) and must be completed so as to be in time for a scheduled presentation. Therefore, there are strong needs of the users for a projector that can make it easy to construct a network system.

SUMMARY OF THE INVENTION

It is an object of the present invention to provide a projector that can make it easy to construct a network system, a network system including a projector, and a method of controlling a projector on a network system.

According to one aspect of the present invention, a projector comprises: an optical engine which projects an image based on a video signal; a circuit section which controls operation of the optical engine; a power source which supplies electric power to the circuit section; a network interface, through which the circuit section communicates with a remote network terminal device; and a hub which is connected to the network interface, the hub including ports, the network interface being connected to the remote network terminal device through one of the ports, electric power from the power source being supplied to the hub.

According to another aspect of the present invention, a projector comprises a main body, and an interface unit which is detachably fitted into the main body. The main body includes: an optical engine which projects an image based on a video signal; a circuit section which controls operation of the optical engine; and a power source which supplies electric power to the circuit section. The interface unit includes: a network interface, through which the circuit section communicates with a remote network terminal device; and a hub which is connected to the network interface, the hub including ports, the network interface being connected to the remote network terminal device through one of the ports, electric power from the power source being supplied to the hub.

According to a further aspect of the present invention, a projector comprises a main body, and a hub unit which is detachably fitted into the main body. The main body includes: an optical engine which projects an image based on a video signal; a circuit section which controls operation of the optical engine; a power source which supplies electric power to the circuit section; and a network interface, through which the circuit section communicates with a remote network terminal device. The hub unit includes a hub which is connected to the network interface, the hub including ports, the network interface being connected to the remote network terminal device through one of the ports, electric power from the power source being supplied to the hub.

According to a further aspect of the present invention, a projector comprises a main body, a first unit which is detachably fitted into the main body, and a second unit which is detachably fitted into the main body. The main body includes: an optical engine which projects an image based on a video signal; a circuit section which controls operation of the optical engine; and a power source which supplies electric power to the circuit section. The first unit includes a network interface, through which the circuit section communicates with a remote network terminal device. The second unit includes a hub which is connected to the network interface, the hub including ports, the network interface being connected to the remote network terminal device through one of the ports, electric power from the power source being supplied to the hub.

According to a further aspect of the present invention, a network system comprises: at least one first projector mentioned above; and at least one computer directly or indirectly connected to the at least one first projector.

Further, the network system may further comprise: at least one second projector; and a communication cable which connects the at least one first projector and the at least one second projector. At least one second projector comprises: a second optical engine which projects an image based on a video signal; a second circuit section which controls operation of the second optical engine; a second power source which supplies electric power to the second circuit section; and a second network interface, through which the second circuit section communicates with a remote network terminal device.

According to a further aspect of the present invention, a method of controlling a projector on a network system; the network system comprises at least one projector and at least one computer. Each projector includes an optical engine which projects an image based on a video signal, a circuit section which controls operation of the optical engine, a network interface through which the circuit section communicates with the at least one computer, and a monitor section which monitors operating status of the optical engine, the circuit section, and the network interface. The method comprises: selecting one or more of at least one projector by the at least one computer; transmitting an operation status request command from the at least one computer to the selected projector; receiving the operation status request command by the selected projector; and transmitting an operation status data based on the operation status request command from the selected projector to at least one computer.

According to a further aspect of the present invention, a method of controlling a projector on a network system; the network system comprises at least one projector and at least one computer; each projector including an optical engine which projects an image based on a video signal, a circuit section which controls operation of the optical engine, a network interface through which the circuit section communicates with the at least one computer, and a monitor section which monitors operating status of the optical engine, the circuit section, and the network interface. The method comprises: selecting one or more of at least one projector by at least one computer; and transmits abnormality notification data from the monitor section of the selected projector to at least one computer, when detecting abnormality of the selected projector.

According to a further aspect of the present invention, a method of controlling a projector on a network system; the network system comprises at least one projector and at least one computer. Each projector includes an optical engine which projects an image based on a video signal, a circuit section which controls operation of the optical engine, a network interface through which the circuit section communicates with the at least one computer, and a monitor section which monitors operating status of the optical engine, the circuit section, and the network interface. The method comprises: selecting one or more of at least one projector by the at least one computer; transmitting a control command from the at least one computer to the selected projector; receiving the control command by the selected projector; and allowing the selected projector to operate in accordance with the control command.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
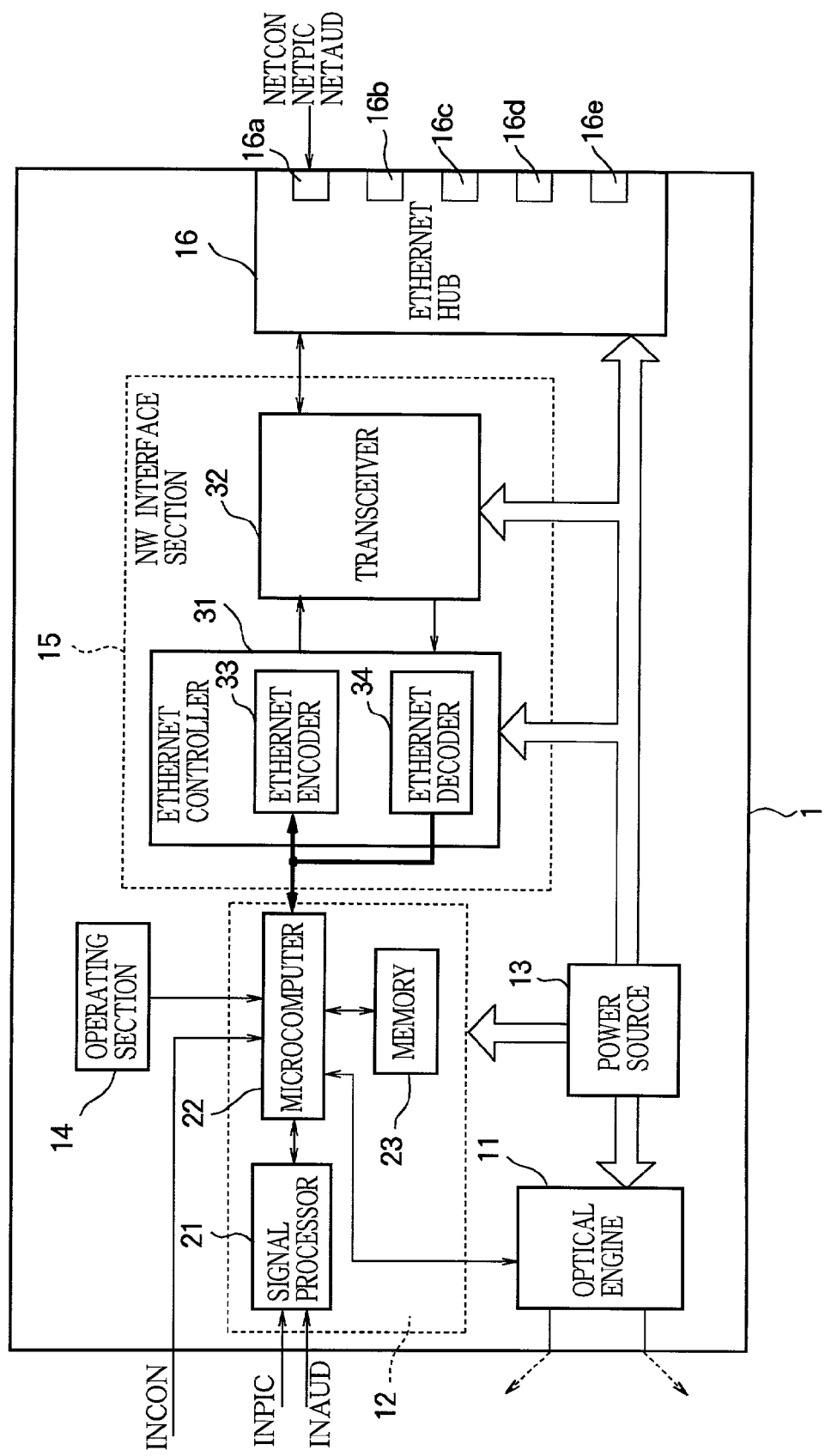
FIG. 1 is a block diagram schematically showing a projector according to a first embodiment of the present invention.

FIG. 1 is a block diagram schematically showing a projector 1 according to the first embodiment of the present invention.

As shown in FIG. 1, the projector 1 according to the first embodiment comprises an optical engine 11 which projects an image based on a video signal, a circuit section 12 which controls operations of the optical engine 11 and other components, and a power source 13 which supplies electric power to the optical engine 11, the circuit section 12, and other components. The projector 1 also comprises an operating section 14 through which a user controls the projector 1, and a loudspeaker or loudspeakers (not shown in the figure). The projector 1 further comprises a network interface section (hereinafter referred to as a NW interface section) 15, through which the circuit section 12 communicates with remote network terminal devices (not shown in FIG. 1) other than the projector 1. The projector 1 further comprises an Ethernet hub 16 which is connected to the NW interface section 15 and the network terminal device. Electric power is supplied to the Ethernet hub 16 by the power source 13. The remote network terminal devices can include, for example, one or more PCs, one or more servers, one or more projectors other than the projector 1, one or more printers, and other devices.

The optical engine 11 includes a light valve which displays an image based on a video signal. The optical engine 11 also includes an optical system that magnifies and projects an image displayed by the light valve on a screen. The light valve is, for example, a liquid crystal display element or a DMD (a trademark of Texas Instruments Corporation) display element. The screen is, for example, a wall-mounted screen which is separated from the projector 1 or a rear projection screen which is a part of the projector 1. Further, the optical engine 11 may be another one that includes three CRTs for R, G, B colors and superimposes three projected images on a screen.

The circuit section 12 comprises a signal processor 21 for processing an input video signal and an input audio signal, a microcomputer (MPU) 22, and a memory 23. The microcomputer 22 controls operations of the signal processor 21, the optical engine 11, and other components. The signal processor 21 processes a video signal INPIC and an audio signal INAUD input from outside. Further, the signal processor 21 processes in a similar manner a video signal NETPIC and an audio signal NETAUD input through the Ethernet hub 16 and the NW interface section 15. The microcomputer 22 controls the projector 1 in accordance with a control command INCON input from outside, a control command input from an operating section 14, and a control command NETCON input through the Ethernet hub 16 and the NW interface section 15. For example, the microprocessor 22 controls the projector 1 to switch between an image based on the video signal INPIC and an image based on the video signal NETPIC. Further, the microcomputer 22 receives a command for selecting one of video signals each input to ports 16a–16e of the Ethernet hub 16 from the operating section 14 or from the connected PCs and the like, and switches the image to be displayed. Further, the microcomputer 22 receives and processes the audio data input through the Ethernet hub 16, and causes the loudspeaker (not shown in the figure) to produce the sound based on the audio data NETAUD. Therefore, it is possible for a user (i.e., a presenter) of the projector 1 to send an audio data from his own PC through the LAN to the loudspeaker provided in the projector 1.

The AC power plug of the power source 13 is connected to an AC wall socket, for example. The power source 13 supplies DC voltages required by each components of the projector 1. Further, the operating section 14 includes an operating switch and/or a remote controller, for instance.

The NW interface section 15 comprises an Ethernet controller 31 and a transceiver 32. The Ethernet controller 31 includes an Ethernet encoder 33 and an Ethernet decoder 34. The Ethernet encoder 33 converts data format for the microcomputer 22 into data format for the Ethernet. The Ethernet decoder 34 converts data format for the Ethernet into data format for the microcomputer 22. The transceiver 32 converts between a signal level for the communication cable (LAN cable, for instance) and a signal level for the Ethernet controller 21.

Figure 5:
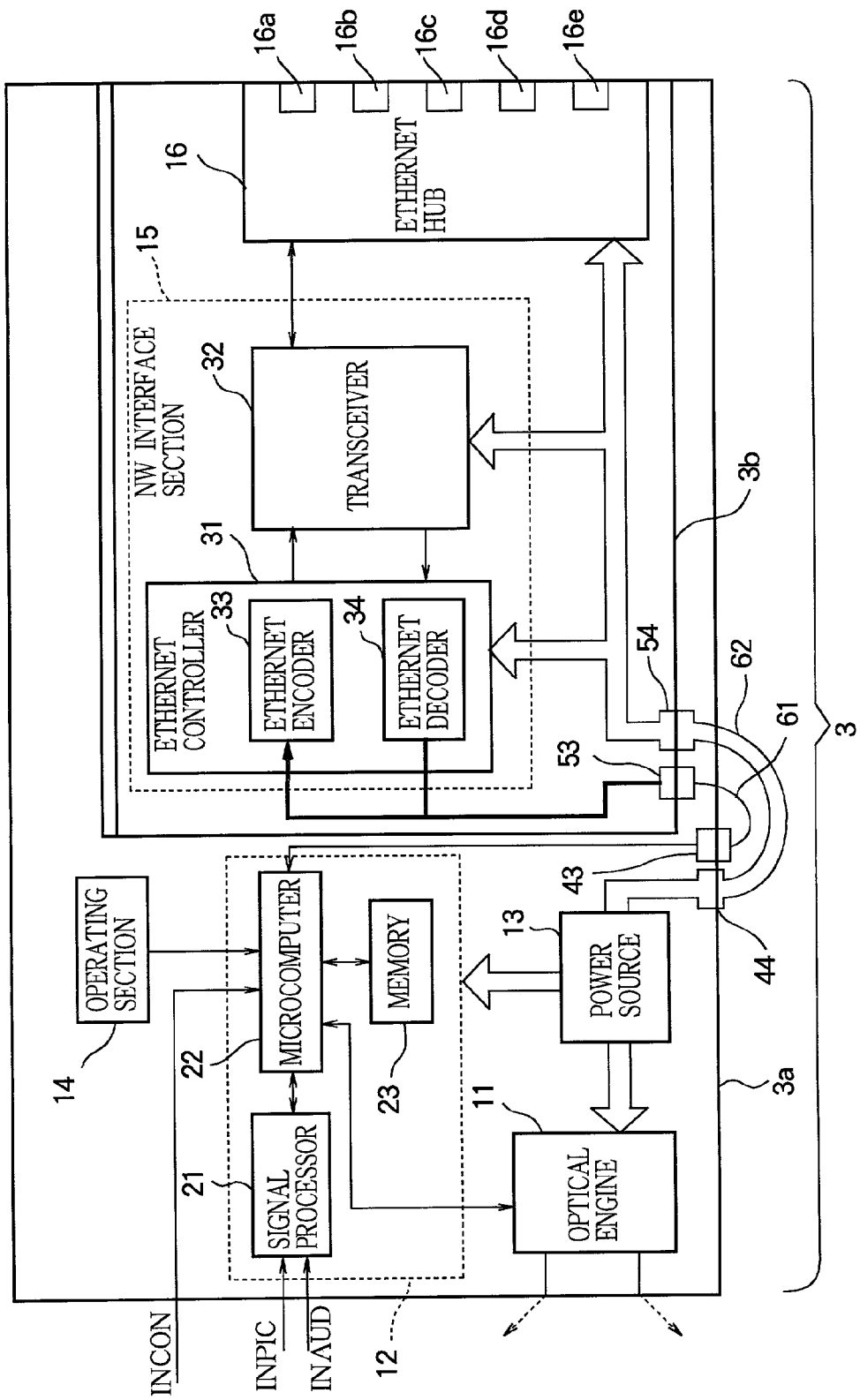
FIG. 5 is a block diagram schematically showing a projector according to a third embodiment of the present invention.

The Ethernet hub 16 includes ports 16a to 16e, to which the communication cables from the network terminal devices such as PCs are connected. Although FIG. 5 shows five ports, number of the ports is not limited to five. Further, the Ethernet hub 16 may be a switching hub which can construct plural paths between ports simultaneously. Furthermore, the Ethernet controller 31 and the Ethernet hub 16 may be other types of controller and hub except for the Ethernet.

The procedures for constructing a network system using the projector 1 according to the first embodiment is as follows. First, the user sets the projector 1 on a platform of a hall, for example, and insert the power cable plug of the projector 1 into an AC wall socket. Next, the user connects his own PC with any of the ports 16a to 16e of the Ethernet hub 16 provided in the projector 1 using a communication cable (10BaseT standard, for instance). The user may connect two or more PCs to the projector 1. If required, audiences' PCs are connected to the projector 1 in a similar manner. After that, if required, network environment settings for the user's PC and the audiences' PCs are conducted by each PC. The construction of the network system including the projector 1 is completed.

In the network system constructed by the above procedures, the user can control the projector 1 from his own PC. For example, the user can control the projector 1 so as to display an image in accordance with the video data stored in the PC and output sound in accordance with the audio data stored in the PC. Further, the user can monitor the status of the projector 1 such as occurrence of abnormal conditions by his own PC. If the user allows his own PC to be shared, the audiences can copy data (video data and audio data, for instance) from the user's PC to the audiences' PCs.

As described above, the projector 1 according to the first embodiment is provided with the Ethernet hub 16 which is operated using electric power supplied by the power source 13. So there is no need to prepare an Ethernet hub unit in addition to the projector, to insert the power cable plug of the Ethernet hub unit into the AC wall socket, to connect the Ethernet hub unit and the projector by the communication cable, and if necessary, to set the network environment by the operating section 14, as the prior art. Therefore, the projector 1 according to the first embodiment makes it possible to simplify construction of the network system.

Further, the projector 1 equipped with the Ethernet hub 16 can avoid forgetting to bring an Ethernet hub unit.

In the projector 1 equipped with the Ethernet hub 16, the Ethernet hub 16 receives electric power from the power source 13 of the projector 1, the power source designed specifically for only the Ethernet hub is not needed, making the Ethernet hub compact and reducing components of the Ethernet hub.

Second Embodiment

Figure 2:
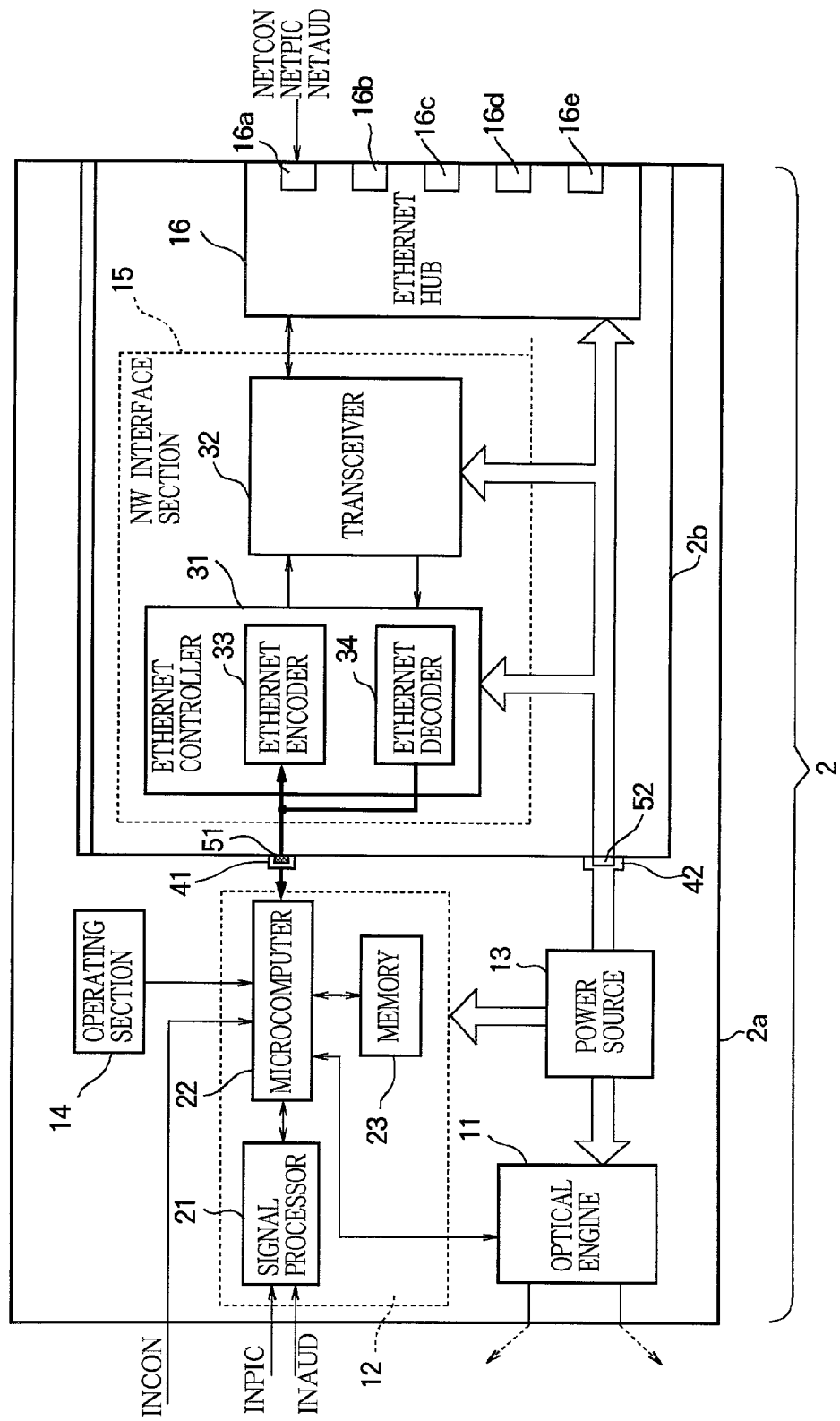
FIG. 2 is a block diagram schematically showing a projector according to a second embodiment of the present invention.
Figure 3:
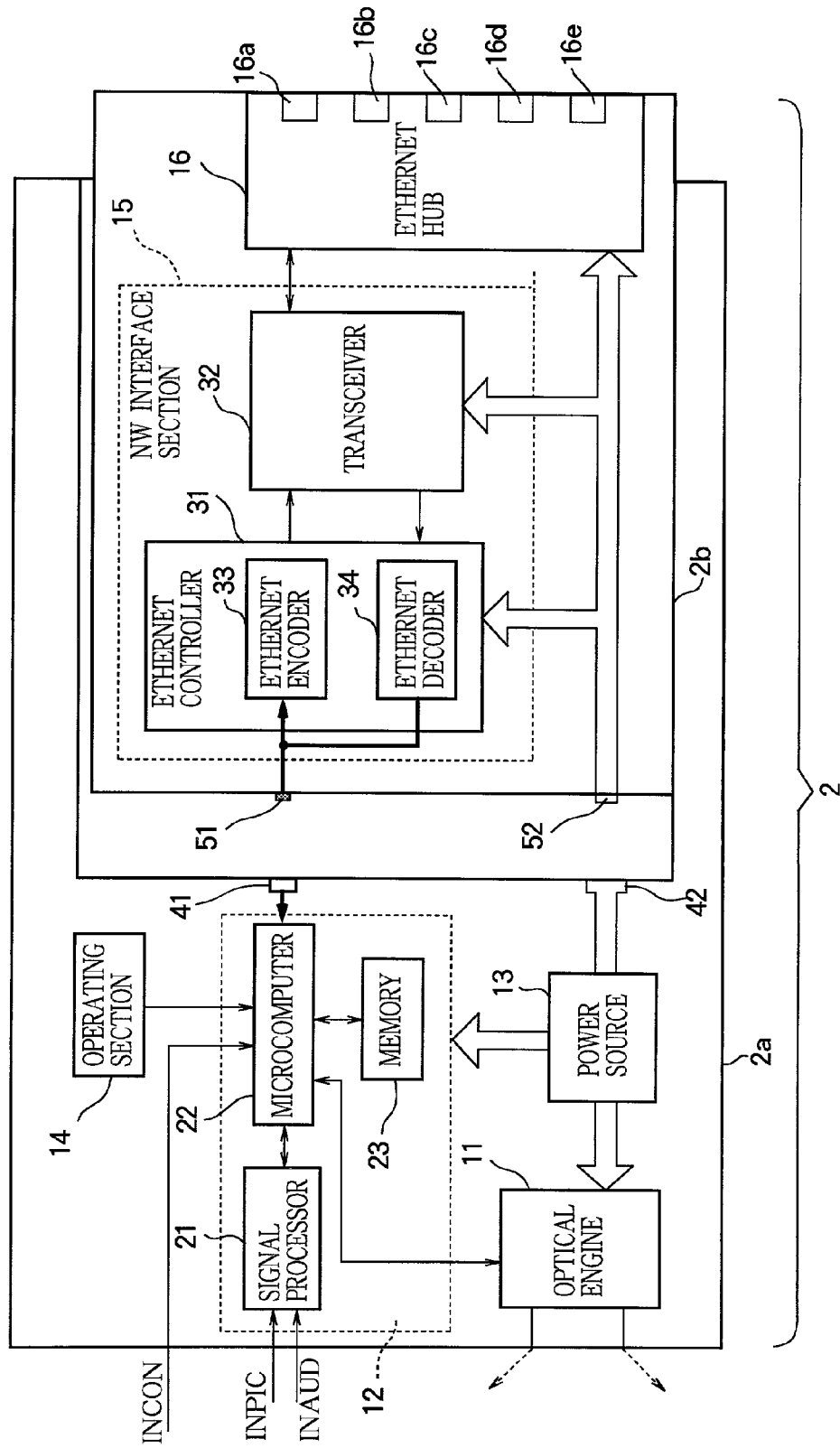
FIG. 3 is a block diagram schematically showing the projector of FIG. 2 when an interface unit is disconnected.

FIG. 2 is a block diagram schematically showing a projector 2 according to the second embodiment of the present invention, and FIG. 3 is a block diagram schematically showing the projector 2 of FIG. 2 when an interface unit 2b is disconnected. Those structures in FIGS. 2 and 3 that are identical to or correspond to structures in FIG. 1 are assigned identical symbols.

As shown in FIGS. 2 and 3, the projector 2 comprises a main body 2a and an interface unit 2b that is detachably fitted into the main body 2a. The interface unit 2b is constructed so that it can be connected or disconnected by inserting or withdrawing the interface unit 2b along the guide grooves or members (not shown in the figures) of the main body 2a. Further, the construction for allowing disconnecting or connecting the interface unit 2b is not limited to the guide grooves or members. For instance, connectors 41, 42, 51, and 52 (below described) provided for electrical connection can have a function of physically connecting the main body 2a and the interface unit 2b as a substitute for the guide grooves or members.

As shown in FIGS. 2 and 3, the main body 2a of the projector 2 comprises the optical engine 11, the circuit section 12, the power source 13, and the operating section 14. The main body 2a of the projector 2 further comprises the connectors 41 and 42.

As shown in FIGS. 2 and 3, the interface unit 2b of the projector 2 comprises the NW interface section 15 and the Ethernet hub 16. The interface unit 2b of the projector 2 further comprises connectors 51 and 52 to be connected to the connectors 41 and 42 of the main body 2a.

In the projector 2 according to the second embodiment, when the interface unit 2b is fitted into the main body 2a as shown in FIG. 2, the connectors 41 and 42 of the main body 2a are coupled to the connectors 51 and 52 of the interface unit 2b. Structures of the connectors 41 and 42 and the connectors 51 and 52 are not limited those shown in FIG. 2.

As described above, in the projector 2 according to the second embodiment, the interface unit 2b may be optional. Only withdrawing the interface unit 2b from the main body 2a, the products for the users who do not wish Ethernet connecting function can be provided.

Figure 4:
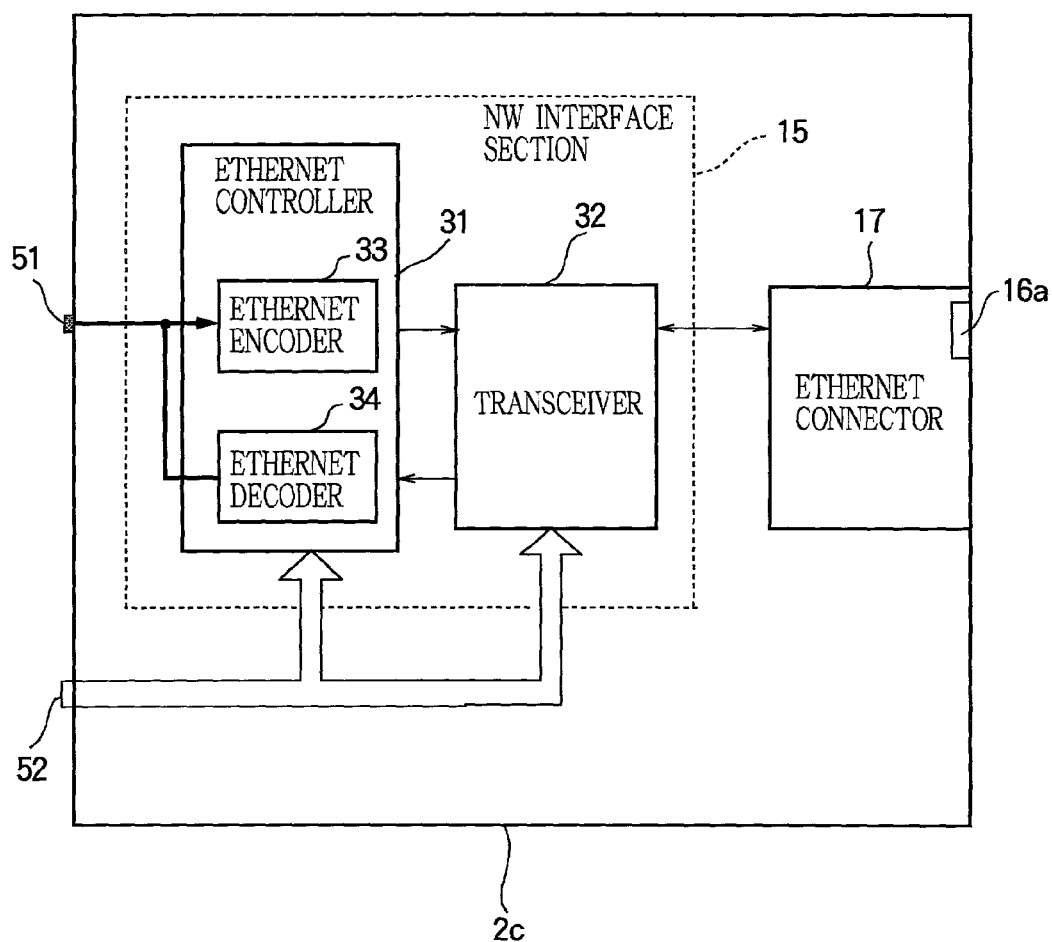
FIG. 4 is a block diagram schematically showing another unit which can be replaced with the interface unit of the projector of FIG. 2.

In case that the interface unit 2b is replaced with another interface unit 2c that has no hub, the products for the users who wish Ethernet connecting function and do not need a hub can be provided. In FIG. 4, a numeral 17 denotes an Ethernet connector including a single port 16a. Except for the above respects, the second embodiment is the same as the first embodiment.

Third Embodiment

FIG. 5 is a block diagram schematically showing a projector 3 according to the third embodiment of the present invention. Those structures in FIG. 5 that are identical to or correspond to structures in FIG. 1 are assigned identical symbols.

As shown in FIG. 5, the projector 3 according to the third embodiment comprises a main body 3a, and an interface unit 3b that is detachably fitted into the main body 3a. The interface unit 3b is constructed so that it can be connected or disconnected by inserting or withdrawing the interface unit 3b along the guide grooves or members (not shown in the figures) of the main body 2a. Further, the construction for allowing disconnecting or connecting the interface unit 3b is not limited to the guide grooves or members.

As shown in FIG. 5, the main body 3a of the projector 3 comprises the optical engine 11, the circuit section 12, the power source 13, and the operating section 14. The main body 3a of the projector 3 further comprises connectors 43 and 44 for electrical connection.

As shown in FIG. 5, the interface unit 3b of the projector 3 comprises the NW interface section 15 and the Ethernet hub 16. The interface unit 3b of the projector 3 further comprises connectors 53 and 54 to be connected to the connectors 43 and 44 by the signal cable 61 and the power cable 62.

In the projector 3 according to the third embodiment, when the interface unit 3b is inserted into the main body 3a as shown in FIG. 5, the interface unit 3b is connected to the main body 3a. After that, the connectors 41 and 42 of the main body 2a are coupled to the connectors 51 and 52 of the interface unit 2b by the cables 61 and 62. The signal cable 61 and the power cable 62 may be included in a single cable. Further, the signal cable 61 and the power cable 62 may be different two cables. Further, the connectors 43 and 44 and the connectors 53 and 54 may be disposed at other places which are different from those shown in FIG. 5. Further, any of the connectors 43 and 44 and the connectors 53 and 54 may be constructed so as to be connected by inserting the interface unit, in a similar manner to FIG. 2 or 3.

As described above, in the projector 3 according to the third embodiment, the interface unit 3b maybe optional. Only withdrawing the interface unit 3b from the main body 3a, the products for the users who do not wish Ethernet connecting function can be provided.

In case that the interface unit 3b is replaced with another interface unit (the unit shown in FIG. 4) that has no hub, the products for the users who wish Ethernet connecting function and do not need a hub can be provided. Except for the above respects, the third embodiment is the same as the first or second embodiment.

Fourth Embodiment

Figure 6:
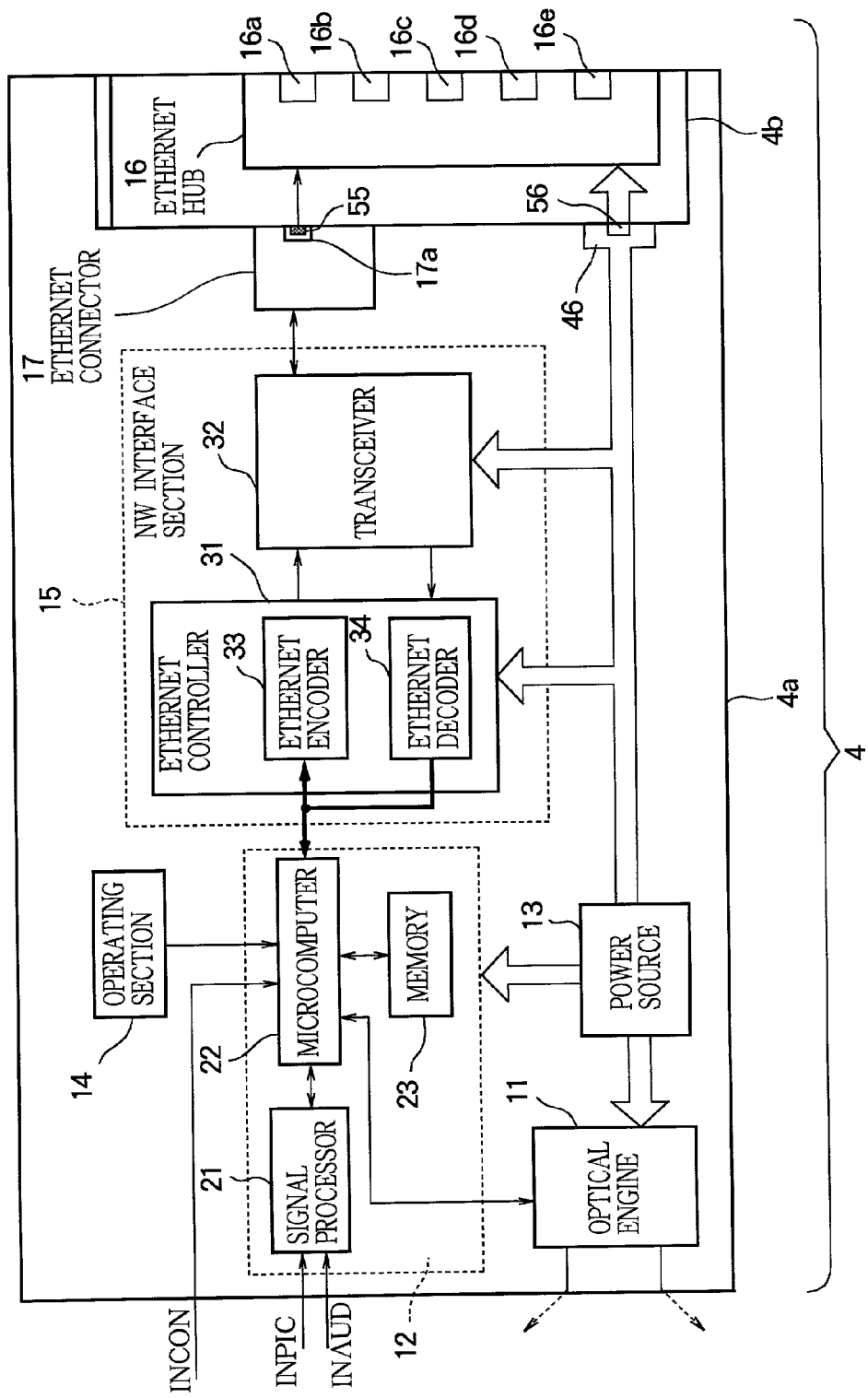
FIG. 6 is a block diagram schematically showing a projector according to a fourth embodiment of the present invention.
Figure 7:
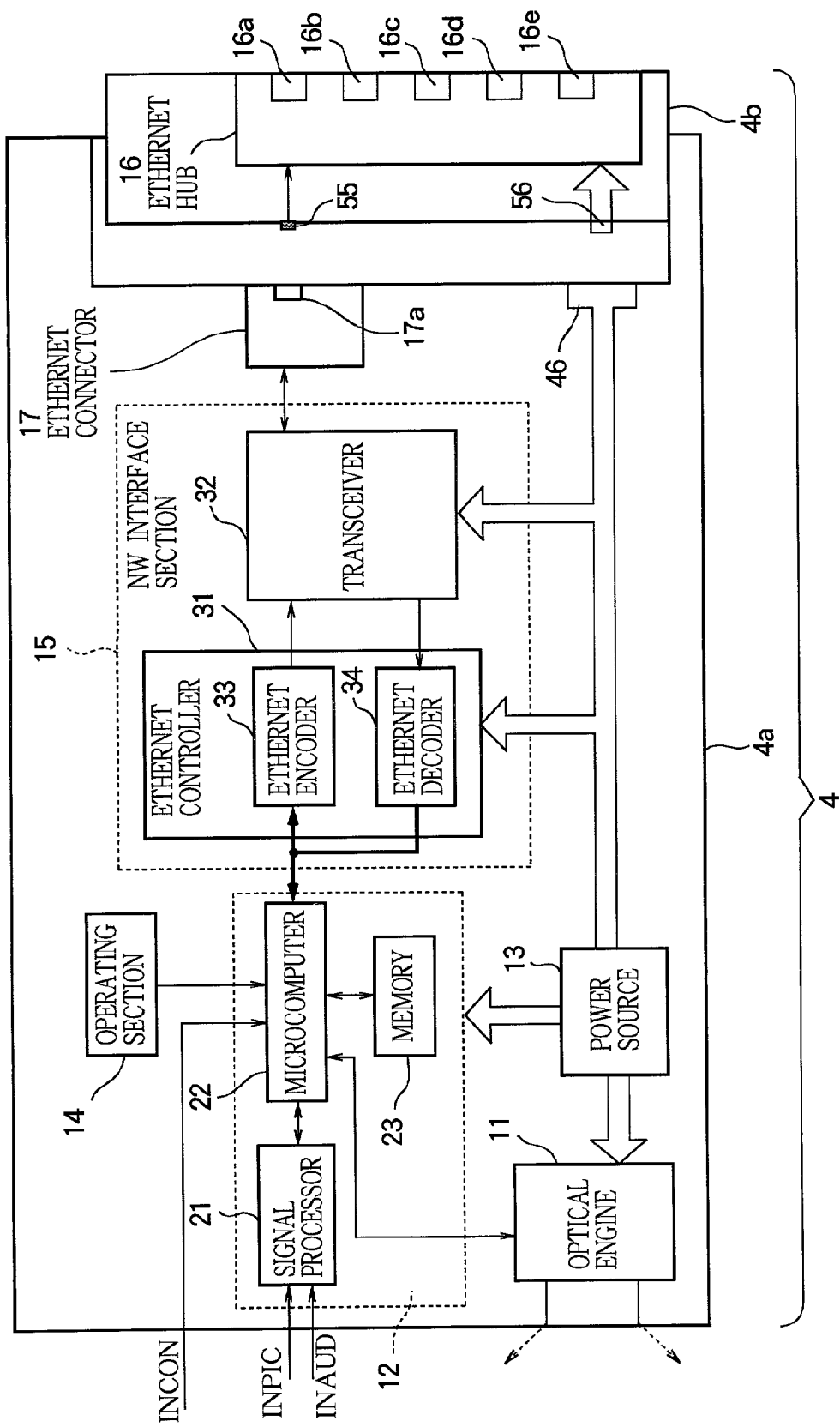
FIG. 7 is a block diagram schematically showing the projector of FIG. 6 when an interface unit is disconnected.

FIG. 6 is a block diagram schematically showing a projector 4 according to the fourth embodiment of the present invention, and FIG. 7 is a block diagram schematically showing the projector 4 of FIG. 6 when a hub unit 4b is disconnected. Those structures in FIGS. 6 and 7 that are identical to or correspond to structures in FIG. 1 are assigned identical symbols.

As shown in FIG. 6 and FIG. 7, the projector 4 according to the fourth embodiment comprises a main body 4a, and a hub unit 4b that is detachably fitted into the main body 4a. The interface unit 4b is constructed so that it can be connected or disconnected by inserting or withdrawing the hub unit 4b along the guide grooves or members (not shown in the figures) of the main body 4a. Further, the construction for allowing disconnecting or connecting the hub unit 4b is not limited to the guide grooves or members.

As shown in FIGS. 6 and 7, the main body 4a of the projector 4 comprises the optical engine 11, the circuit section 12, the power source 13, the operating section 14, the NW interface section 15, and the Ethernet connector 17. The main body 4a of the projector 4 further comprises a port 17a and a connector 46 for electric power.

As shown in FIGS. 6 and 7, the hub unit 4b of the projector 4 comprises the Ethernet hub 16. The hub unit 4b of the projector 4 further comprises connectors 55 and 56 to be connected to the port 17a and the connector 46.

In the projector 4 according to the fourth embodiment, when the hub unit 4b is inserted into the main body 4a as shown in FIG. 6, the port 17a and the connector 46 of the main body 4a are fitted into the connectors 55 and 56 of the hub unit 4b, respectively. Further, the port 17a, the connector 46, and the connector 55 and 56 may be disposed at other places. Further, cables may be used for connecting between the port 17a and the connector 55 or between the connector 51 and the connector 56 in a similar manner to the third embodiment.

As described above, in the projector 4 according to the fourth embodiment, the hub unit 4b may be optional. Only withdrawing the hub unit 4b from the main body 4a, the products for the users who do not need Ethernet connecting function can be provided.

Fifth Embodiment

Figure 8:
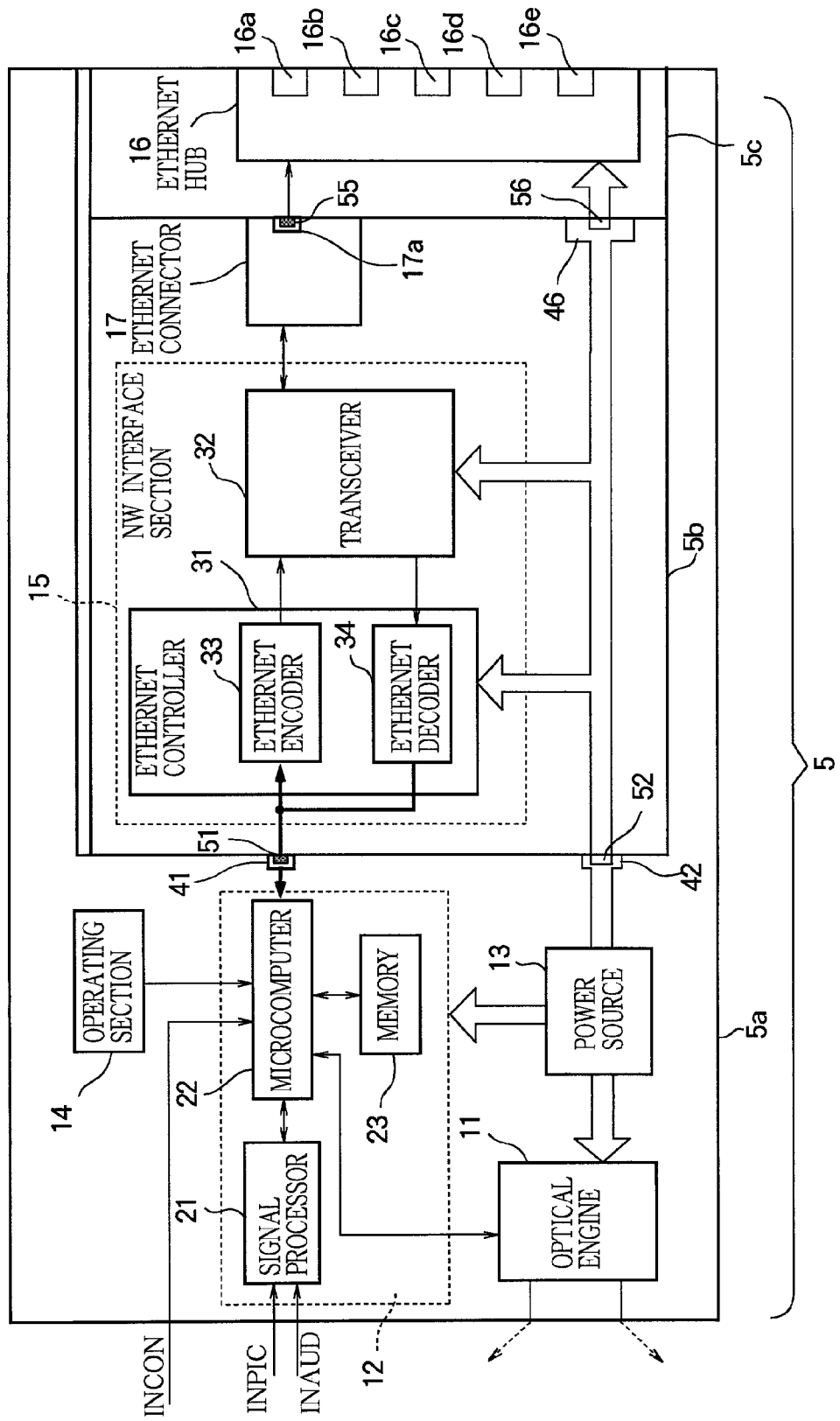
FIG. 8 is a block diagram schematically showing a projector according to a fifth embodiment of the present invention.
Figure 9:
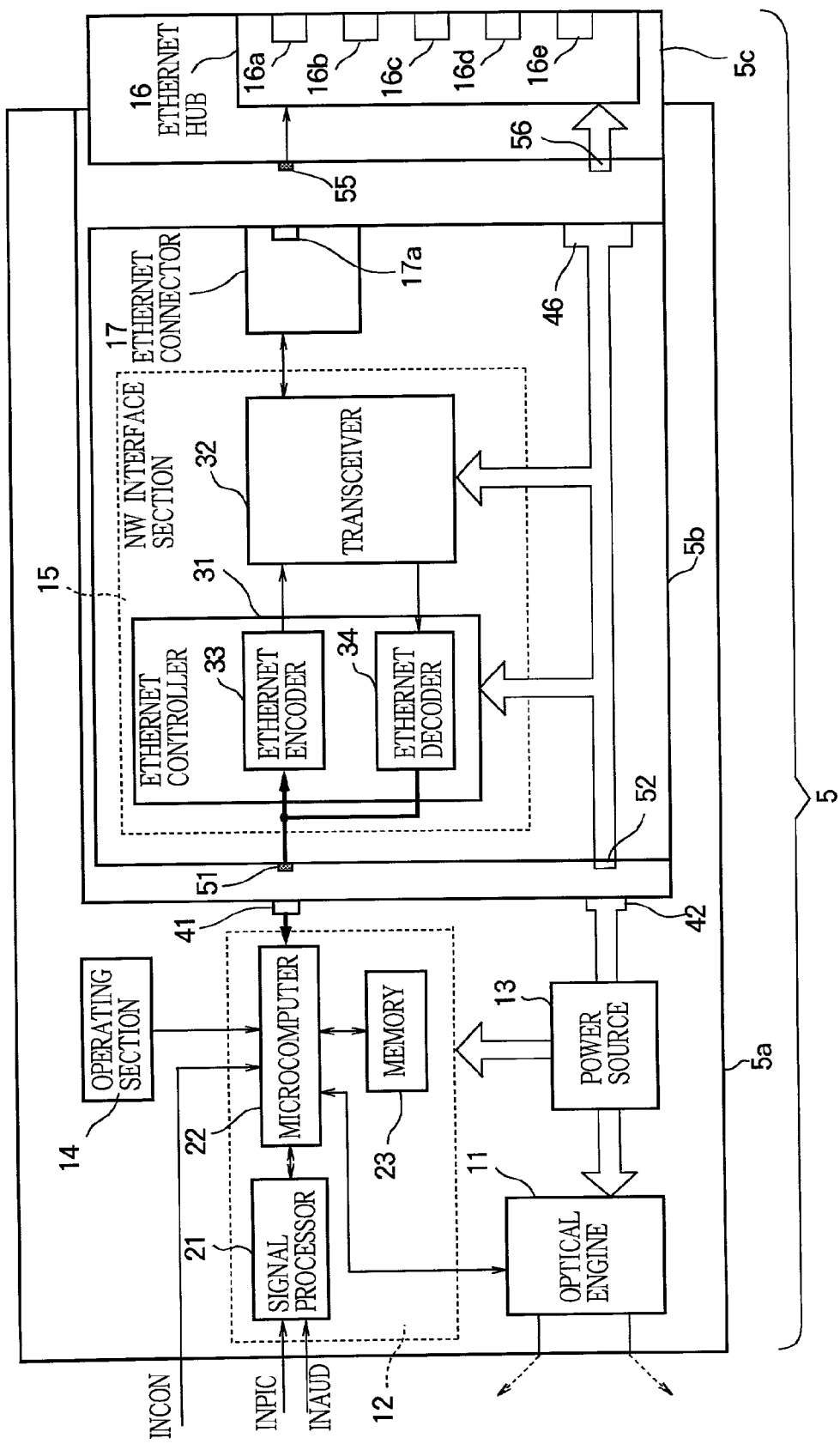
FIG. 9 is a block diagram schematically showing the projector of FIG. 8 when a first unit and a second unit are disconnected.

FIG. 8 is a block diagram schematically showing a projector 5 according to the fifth embodiment of the present invention, and FIG. 9 is a block diagram schematically showing the projector 5 of FIG. 8 when the first unit 5a and the second unit 5b are disconnected. Those structures in FIGS. 8 and 9 that are identical to or correspond to structures in FIG. 1 are assigned identical symbols.

As shown in FIGS. 8 and 9, the projector 5 comprises a main body 5a, and the first and second units 5b and 5c that is detachably fitted into the main body 5a. The first and second units 5b and 5c are constructed so that they can be connected or disconnected by inserting or withdrawing the interface unit 5b along the guide grooves or members (not shown in the figures) of the main body 5a. Further, the construction for allowing disconnecting or connecting the first and second units 5b and 5c is not limited to the guide grooves or members.

As shown in FIGS. 8 and 9, the main body 5a of the projector 5 comprises the optical engine 11, the circuit section 12, the power source 13, and the operating section 14. The main body 5a of the projector 5 further comprises connectors 41 and 42.

As shown in FIGS. 8 and 9, the first unit 5*b* of the projector 5 comprises the NW interface section 15 and the Ethernet connector 17. The first unit 5*b* of the projector 5 further comprises connectors 51 and 52 to be connected to the connectors 41 and 42. The first unit 5*b* of the projector 5 further comprises a port 17*a* and a connector 46 for electric power.

As shown in FIGS. 8 and 9, the second unit 5*c* of the projector 5 comprises the Ethernet hub 16. The second unit 5*b* of the projector 5 further comprises connectors 55 and 56 to be connected to the port 17*a* and the connector 46, respectively.

In the projector 5 according to the fifth embodiment, when the first and second units 5*b* and 5*c* are fitted into the main body 5*a* as shown in FIG. 8 in this order, the connectors 41 and 42 of the main body 5*a* are coupled to the connectors 51 and 52 of the first unit 2*b*, respectively. The port 17*a* and the connector 46 of the main body 5*a* are coupled to the connectors 55 and 56 of the hub unit 5*b*, respectively. Further, the port 17*a*, the connector 46, the connectors 55 and 56 may be disposed at other places. Further, cables may be used for connecting between the port 17*a* and the connector 55 and/or between the connector 51 and the connector 56 in a similar manner to the third embodiment.

As described above, in the projector 5 according to the fifth embodiment, the first and second units 5*b* and 5*c* may be optional. Only withdrawing the second unit 5*c* from the main body 5*a*, the products for the users who do not need an Ethernet hub can be provided. Further, by withdrawing the first and second units 5*b* and 5*c* from the main body 5*a*, the products for the users who do not need Ethernet connecting function can be provided. Except for the above respects, the fifth embodiment is the same as the first to fourth embodiment.

Sixth Embodiment

Figure 10:
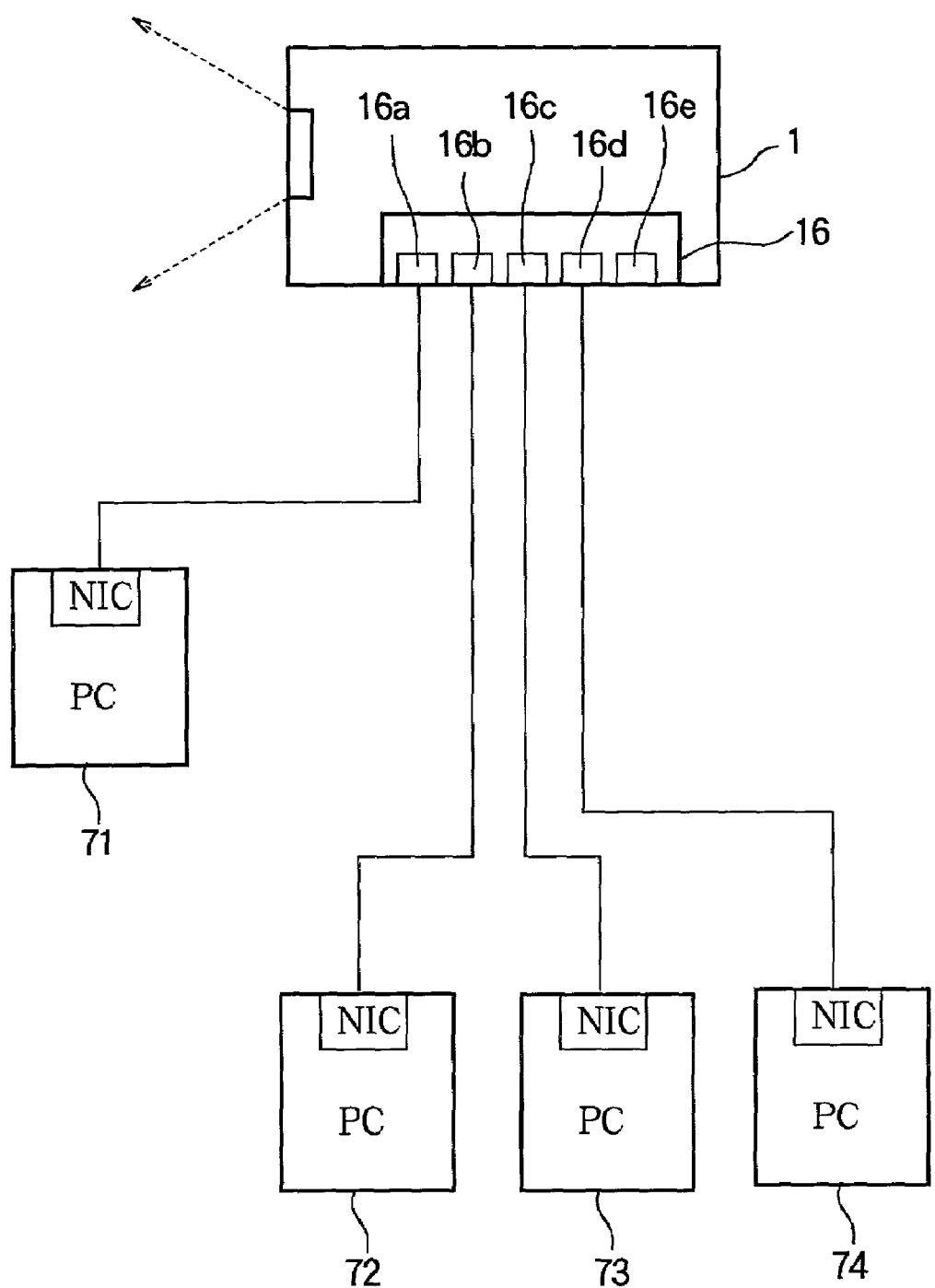
FIG. 10 is a block diagram schematically showing a network system according to a sixth embodiment of the present invention.

FIG. 10 is a block diagram schematically showing a network system according to the sixth embodiment of the present invention.

As shown in FIG. 10, the network system according to the sixth embodiment comprises the projector 1 shown in FIG. 1, a user's (presenter's) PC 71 connected to the port 16*a* of the Ethernet hub 16 of the projector 1, and audiences' PCs 72 to 74 connected to the ports 16*b*, 16*c*, 16*d* of the Ethernet hub 16 of the projector 1. Further, in FIG. 10, NIC denotes a network interface card provided in each PC.

In the network system according to the sixth embodiment, the microcomputer of the projector 1 detects what kind of devices are connected to the port of the Ethernet hub 16 of the projector 1 (namely, connection status). Further, the microcomputer of the projector 1 obtains IP (Internet Protocol) address of the network terminal device (for example, PC) or PC information such as PC name through the Ethernet hub 16 of the projector 1. The projector 1 displays a menu as a connected PCs list concerning the PC information such as IP address and PC name. By selecting a PC from the menu, the projector 1 requests image data to a designated PC, receives it and projects an image.

As described above, the network system according to the sixth embodiment includes the projector 1 provided with the Ethernet hub 16 which is operated using electric power supplied by the power source 13. So there is no need to prepare another Ethernet hub unit, to insert a power cable plug of the Ethernet hub unit into an AC wall socket, to connect the Ethernet hub unit to the projector by a communication cable, and to set network environment for the user's PC and the audiences' PCs. Therefore, the network system according to the sixth embodiment makes it possible to simplify construction of the network system.

Further, the above description is a case in which the network system is constructed using the projector 1, but the network system according to the sixth embodiment may be constructed using any of the projector 2 of FIG. 2, the projector 3 of FIGS. 3 and 4, the projector 5 of FIGS. 8 and 9.

Seventh Embodiment

Figure 11:
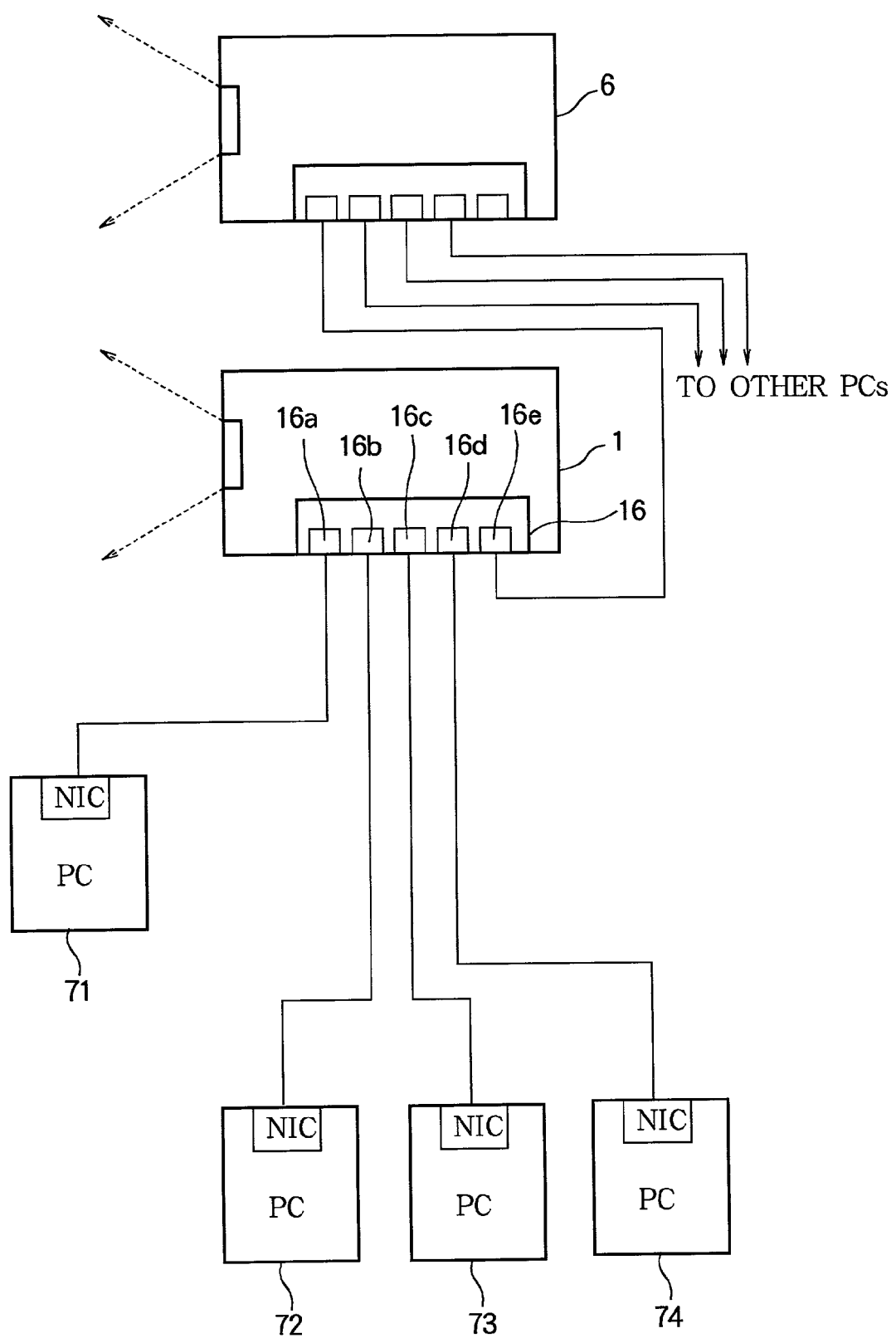
FIG. 11 is a block diagram schematically showing a network system according to a seventh embodiment of the present invention.

FIG. 11 is a block diagram schematically showing a network system according to the seventh embodiment of the present invention. Those structures in FIG. 11 that are identical to or correspond to structures in FIG. 10 are assigned identical symbols.

As shown in FIG. 11, the network system according to the seventh embodiment is different from that according to the sixth embodiment in respects that another projector 6 is connected to the port 16*e* of the projector 1 shown FIG. 1. The projector 1 and the projector 6 may be any of the projector 2 of FIG. 2, the projector 3 of FIGS. 3 and 4, the projector 4 of FIGS. FIGS. 6 and 7, and the projector 5 of FIGS. 8 and 9.

In the network system according to the seventh embodiment, presentation can be conducted using two projectors. Further, monitoring and control of the projectors can be possible by an arbitrary PC. Furthermore, quantities of the projectors can be three or more. Moreover, except for the above, the seventh embodiment is the same as the sixth embodiment.

Eighth Embodiment

Figure 12:
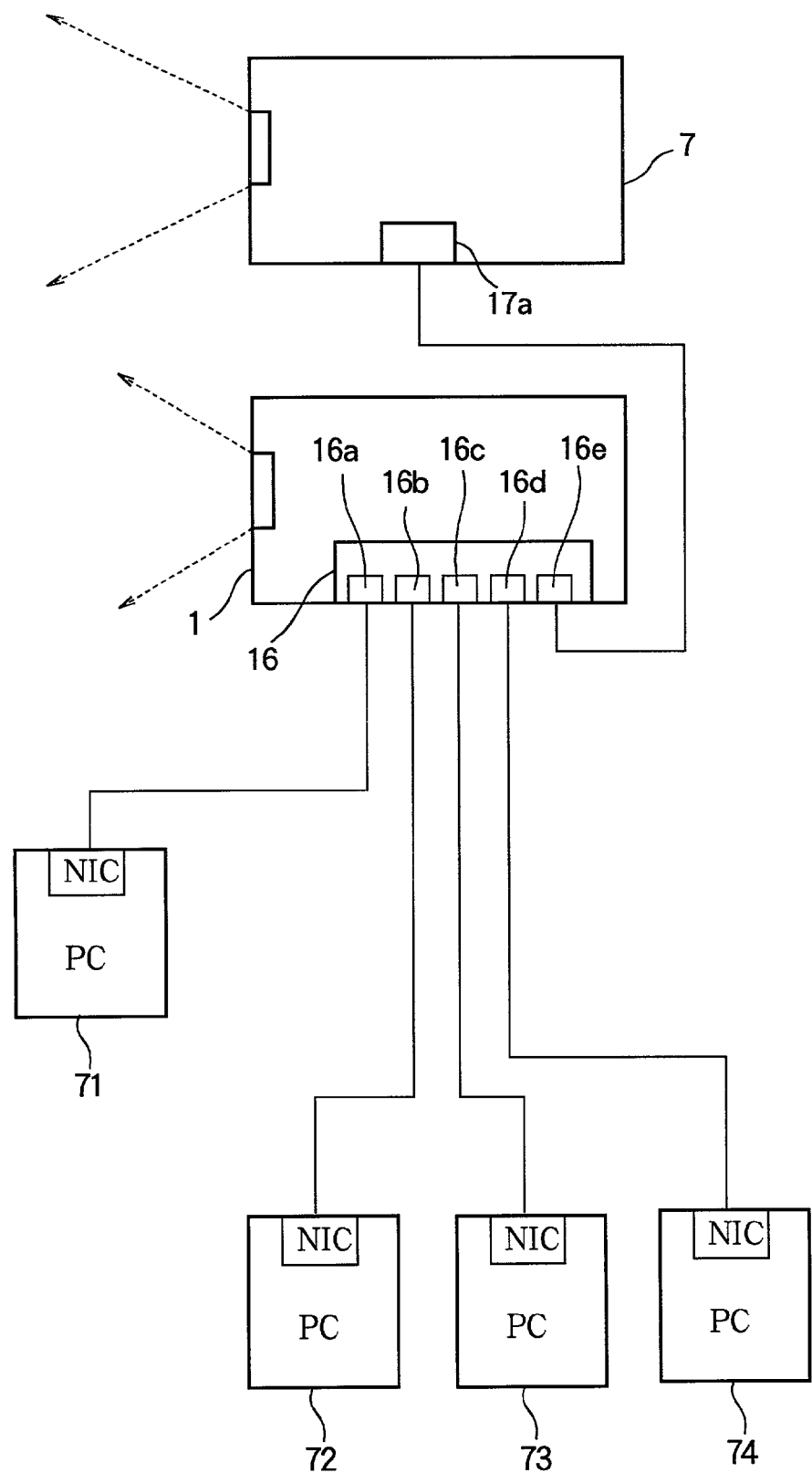
FIG. 12 is a block diagram schematically showing a network system according to an eighth embodiment of the present invention.
Figure 13:
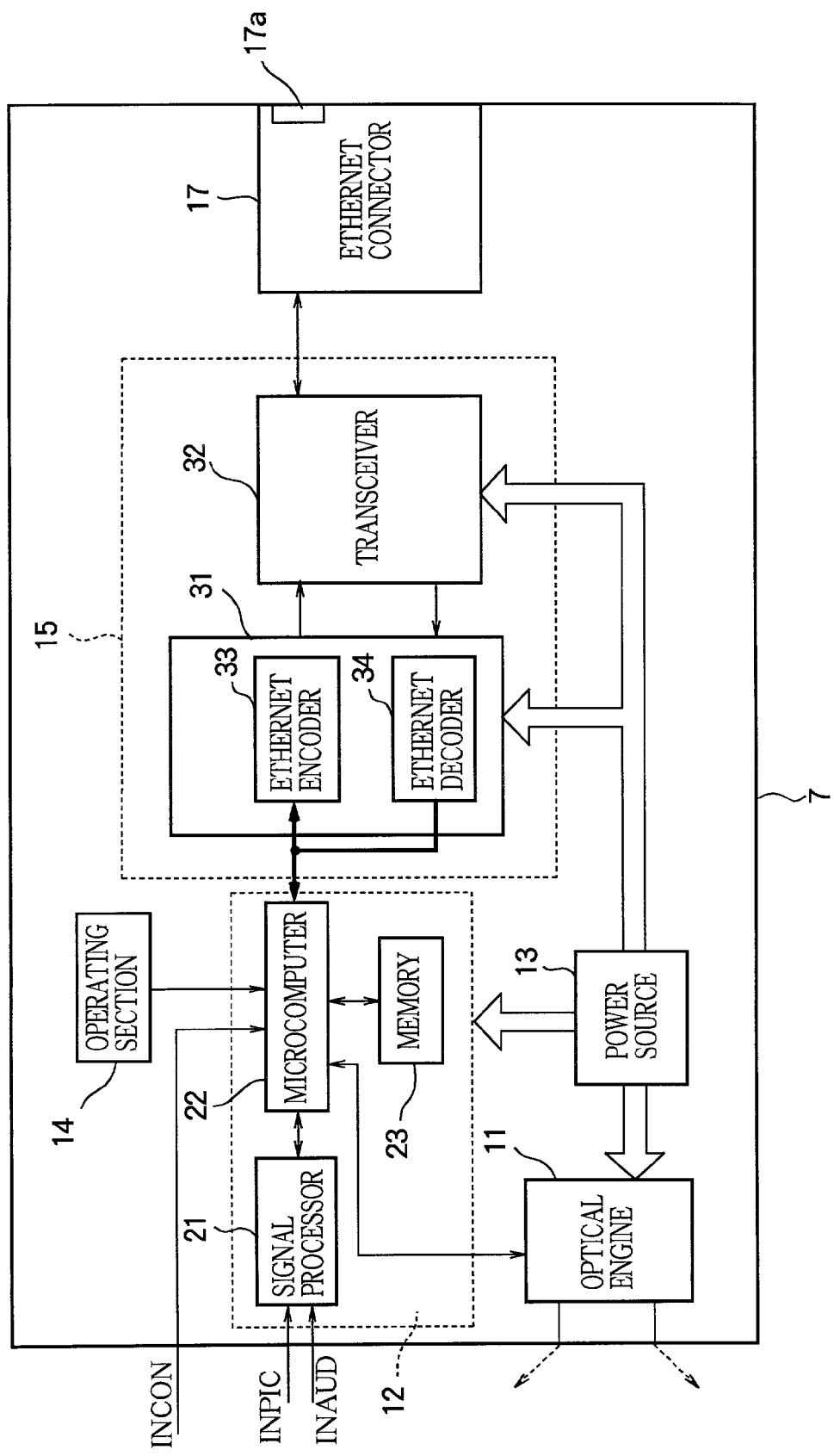
FIG. 13 is a block diagram schematically showing a projector used as another projector of FIG. 12.

FIG. 12 is a block diagram schematically showing a network system according to the eighth embodiment of the present invention, and FIG. 13 is a block diagram schematically showing another projector 7 of FIG. 12. Those structures in FIG. 12 that are identical to or correspond to structures in FIG. 11 are assigned identical symbols.

As shown in FIG. 12, the network system according to the eighth embodiment is different from that according to the sixth embodiment in respects that another projector 7 is provided in replacement of the projector 6. As shown in FIG. 13, the projector 7 comprises the Ethernet connector 17 as a substitute for the Ethernet hub 16.

In the network system according to the eighth embodiment, presentation can be conducted using two projectors. Further, monitoring and control of the projectors can be possible by an arbitrary PC. Furthermore, quantities of the projectors can be three or more. Moreover, except for the above, the eighth embodiment is the same as the sixth or seventh embodiment.

Ninth Embodiment

Figure 14:
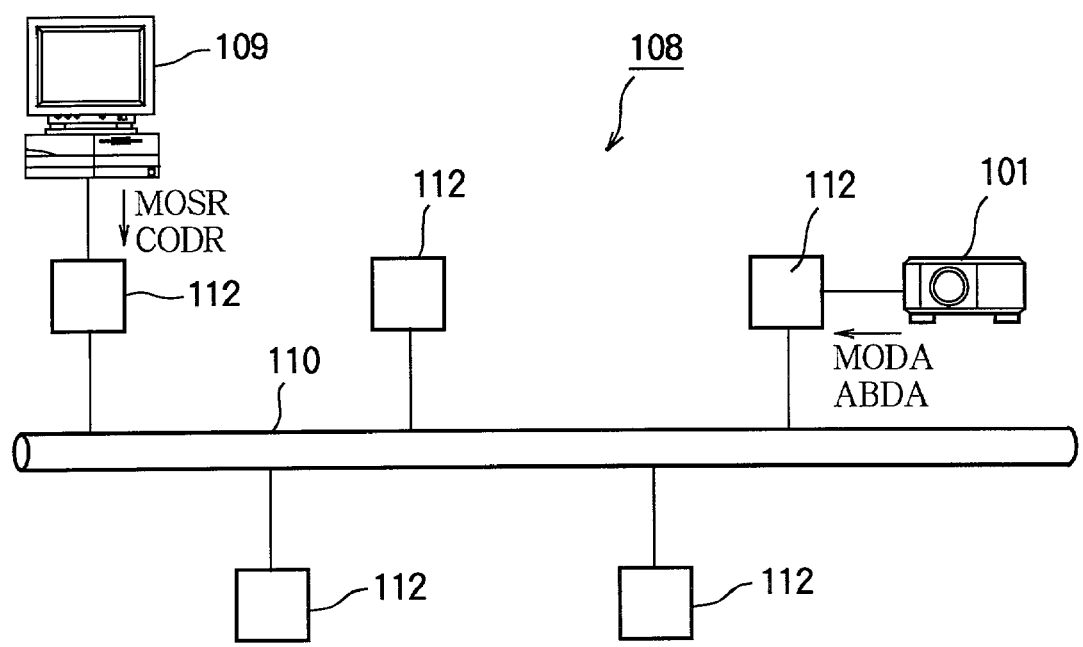
FIG. 14 is a block diagram showing a network system for executing a method of controlling a projector on a network system according to a ninth embodiment of the present invention.

FIG. 14 is a block diagram showing a network system for executing a method of centralized-controlling a projector according to the ninth embodiment of the present invention. The bus network 108 shown in FIG. 14 is constructed as the Ethernet. A projector 101 is connected to a PC 109 through a communication cable 110. As shown in FIG. 14, the communication cable 110 is connected to terminal devices such as the projector 101 and the PC 109 through communication connectors 112. The communication connectors 112 are provided for a LAN connection between the terminal devices, and can be located at any place desired, thus allowing a plurality of PCs and a plurality of projectors to be connected through such communication connectors 112. The communication cable 110 may be an optical fiber cable 10baseF, a coaxial cable 10base5, a coaxial cable 10base2, a twisted pair line 10baseT, or the like.

The Ethernet employs an access method called CSMA/CD (Carrier Sense Multiple Access with Collision Detection) to allow a single transmission medium to be shared by a plurality of terminals connected thereto. The CSMA/CD operates as follows:

(Step 1) Before a transmission, the condition of a transmission line is checked.

(Step 2) If the transmission line is available, the transmission is started.

(Step 3) If the transmission line is unavailable, a stand-by condition is kept until the transmission line becomes available.

(Step 4) During the transmission, the occurrence of a collision on the transmission line is always watched.

(Step 5) Upon detecting a collision, the transmission is immediately interrupted, and a JAM signal is transmitted to notify other terminals of the occurrence of the collision.

(Step 6) Upon completion of the transmission of the JAM signal, the sequence beginning with the step 1 is repeated. In this manner, the Ethernet is capable of avoiding a collision while connecting a number of terminals to a single cable. By using the Ethernet to construct a network, a communication between a plurality of PCs and a plurality of projectors is made possible.

Figure 15:
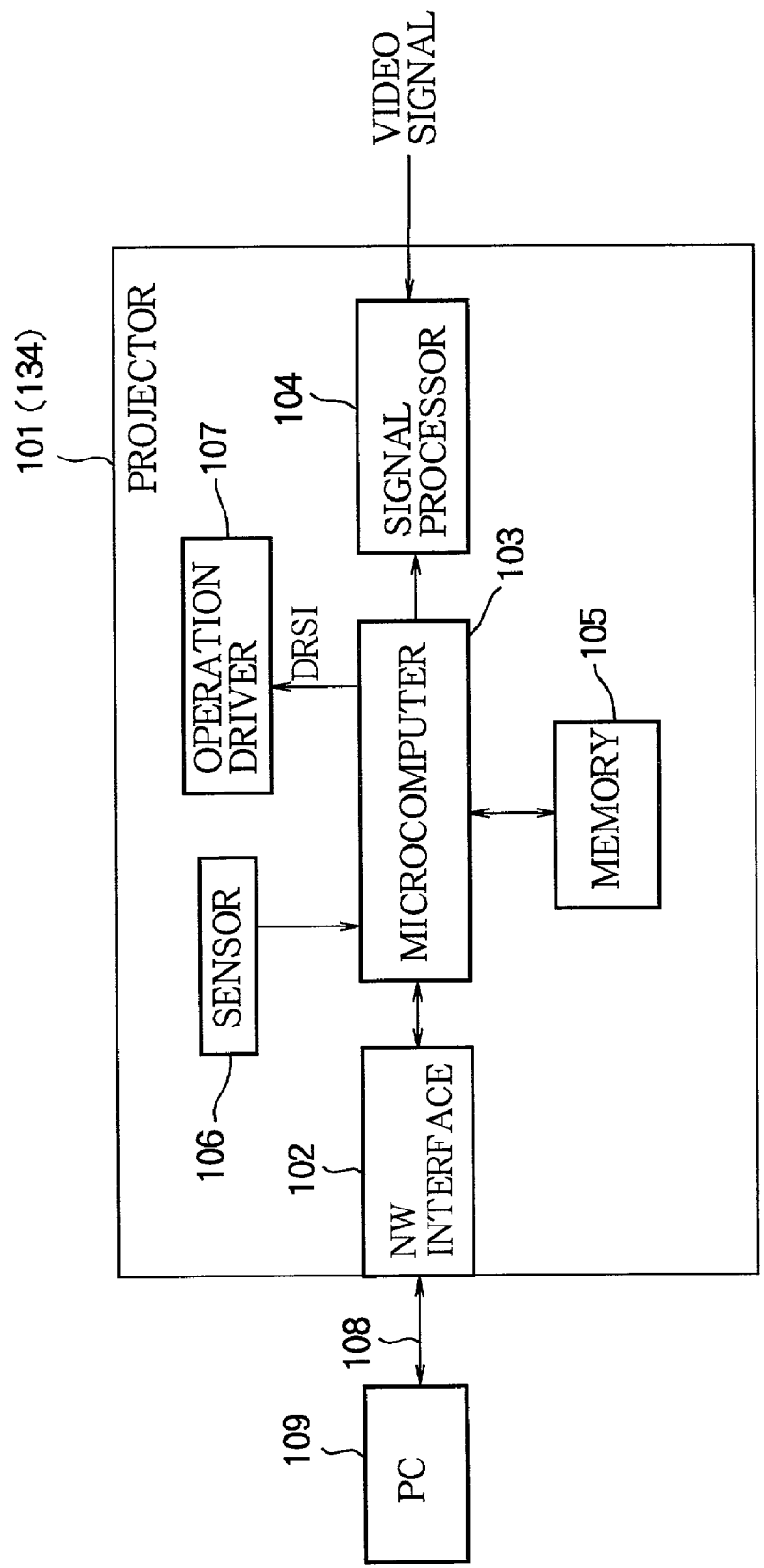
FIG. 15 is a block diagram schematically showing the projector of FIG. 14.

FIG. 15 is a block diagram schematically showing the projector of FIG. 14. As shown in FIG. 15, a PC 109 and a projector 101 are connected to each other through the network 108 that is constructed as the Ethernet of FIG. 14. The projector 101 comprises a microcomputer 103 which controls the entire projector, a NW interface section 102 connected to the network 108, a memory 105 for storing operation status data, a signal processor 104 which processes an input video signal to display an image based on the video data on a display screen (not shown), a sensor 106 for detecting an operating status of the projector, and an operation driver 107 which drives a variety of operations of the projector 101.

During the operation of the projector 101, the microcomputer 103 monitors an internal temperature information or an abnormality information indicating a lamp burn-out which are input from the sensor 106. The microcomputer 103 executes a control over the cumulative time of lamp use, the type of an input video signal channel and the useful life of a lamp, and sequentially updates the operating status data of the projector 101 to store latest information in the memory 105. The sensor 106 and the monitoring system of the microcomputer 103 function as a monitor section.

As will be described later, in response to a control command received, the microcomputer 103 controls the operation driver 107 of the projector 101 to control a series of functional operations of the projector including the turn-on and-off of a power supply from the power source (not shown in the figure), the switching of the video input channel, and the adjustment of the brightness and the contrast of an image being displayed.

Figure 16:
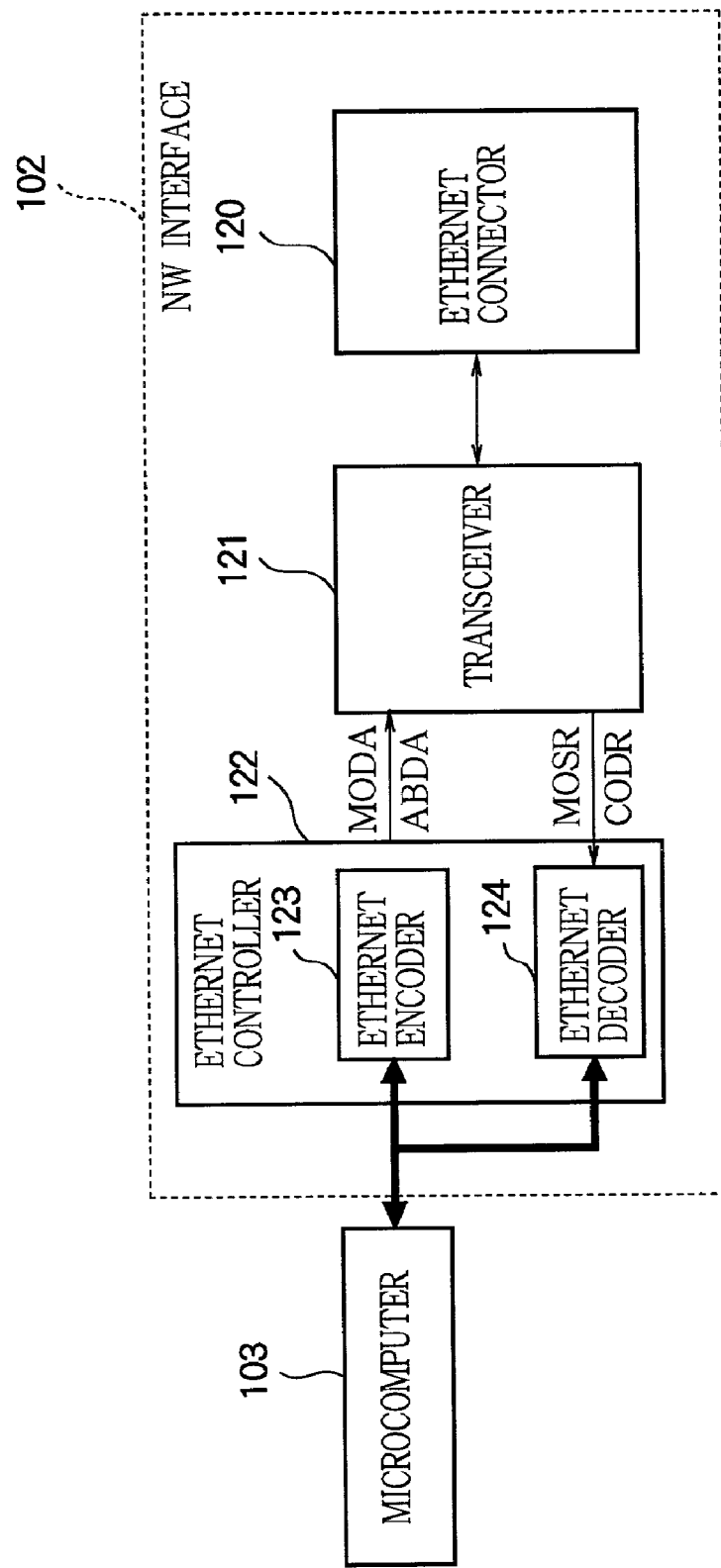
FIG. 16 is a block diagram schematically showing a network interface section of FIG. 15.

FIG. 16 is a block diagram schematically showing a network interface section 102 of FIG. 15. The NW interface section 102 of the projector 101 is constructed to be compatible with the Ethernet. As shown in FIG. 16, an Ethernet controller 122 performs a conversion between data format which is used in the processing by the microcomputer 103 and data format which is dealt with by the Ethernet, and transmits and receives data in conformity to the communications protocol of the Ethernet. Specifically, it includes an Ethernet encoder 123 which converts the data format used in the processing of the microcomputer 103 into the data format dealt with by the Ethernet, and an Ethernet decoder 124 which converts the data format dealt with by the Ethernet into the data format which is used in the processing by the microcomputer. The Ethernet controller 122 is controlled by the microcomputer 103 that controls the entire projector 101 (FIG. 14).

The NW interface section 102 also includes a transceiver 121 which performs a conversion between an electrical signal level on the communication cable (FIG. 14) used for the data transmission and reception and the signal level of the Ethernet controller 122, and an Ethernet connector 120 which is connected to a cable that is connected to the communication connector 112 (FIG. 14) of the network 108 to provide a data communication path between the transceiver 121 and the network 108.

A flow of signal when the PC 109 controls the operating status of the projector 1 which is connected through the Ethernet will now be described. Initially, the PC 109 transmits an operating status request command MOSR to the NW interface section 102 in a particular projector 101 through the network 108. The request command MOSR is then input to the transceiver 121 through the Ethernet connector 120 in the NW interface section 102 which is shown in FIG. 16. When there are a plurality of projectors on the network and a particular projector is to be specified for transmission, the particular projector can be specified by assigning an IP address allocated to each projector when the protocol used in the Ethernet is TCP/IP (Transmission Control Protocol/Internet Protocol).

The transceiver 121 receives the operating status request command, and the Ethernet controller 122 converts the voltage level so as to allow the operating status request command to be processed, and the command is transmitted to the Ethernet decoder 124 in the Ethernet controller 122. The Ethernet decoder 124 converts the received operating status request command MOSR into the data format which is used for the processing by the microcomputer 103, and sends it to the microcomputer 103.

Upon receiving the operating status request command, the microcomputer 103 reads the memory 105 in which operating status data such as the internal temperature information is sequentially updated and stored, and sends the operating status data MODA to the Ethernet encoder 123 in the Ethernet controller 122.

The Ethernet encoder 123 converts the received operating status data MODA into the data format which is dealt with in the Ethernet, and sends it to the transceiver 121 which then performs a level conversion of the converted operating status data to the electrical signal level on the cable and then transmits the operating status data MODA to the PC 109 through the Ethernet connector 120 and the network 108.

A flow of signals when the PC 109 controls the operation of the projector 101 connected to the Ethernet will be described. The PC 109 transmits an operation control command CODR to the NW interface section 102 in the projector 101 through the network 108. The operation control command CODR is transmitted through the Ethernet connector 120, the transceiver 121 and the Ethernet decoder 124 of the Ethernet 122 to the microcomputer 103, in the similar manner as in the flow of the operating status request command MOSR.

Upon receiving the operation control command CODR, the microcomputer 151 examines the operation command, and sends an operation command signal DRSI such as the turn-on and-off of the power supply or a switching of the video input channel to the operation driver 107 for execution thereof.

A flow of signals which occurs when notifying a PC 109 connected to the Ethernet of the occurrence of an abnormal event in the projector will now be described. When the microcomputer 103 receives abnormality information indicating a lamp burn-out, for example, from the sensor 106, it sends abnormality notification data ABDA to the Ethernet encoder 123 in the Ethernet controller 122. Subsequently, the abnormality notification data ABDA is transmitted to the PC 109 through the transceiver 121, the Ethernet connector 120 and the network 108 in the similar manner as in the flow of the operating status data MODA.

The following effects can be obtained by using the method of centralized-controlling projectors according to the ninth embodiment in the Ethernet including at least one PC and at least one projector. First, a user can monitor operating status and abnormal conditions of a plurality of projectors and control operation of individual projectors by using a single PC. Second, a user can monitor and control a particular projector by using a plurality of PCs. Third, a user can carry out each communication between a plurality of PCs and a plurality of projectors with avoiding interference, collision or the like.

Tenth Embodiment

Figure 17:
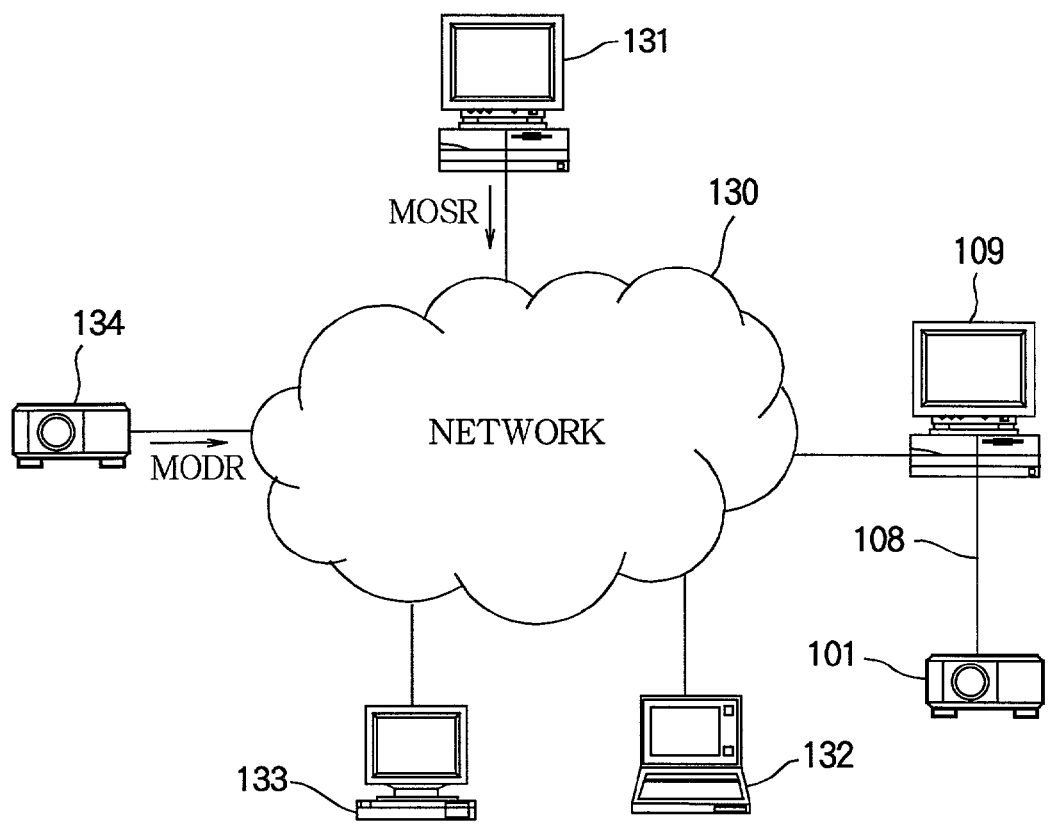
FIG. 17 is a block diagram showing a network system for executing a method of controlling a projector on a network system according to a tenth embodiment of the present invention.

FIG. 17 is a block diagram showing a network system for executing a method of centralized-controlling projectors according to the tenth embodiment of the present invention. Referring to FIG. 17, a PC 109 and a projector 101 are connected to each other through the network 108 shown in the above-described ninth embodiment (FIGS. 14 and 15). The PC 109 is also connected to other PCs 131, 132, 133 and another projector 134 through another network 130 that includes a communication line.

The network 130 utilizes the Internet as an open network, for example, so any computer which conforms to the communications protocol TCP/IP can be connected freely to the network 130 in principle. The projector 134 is connected to the network 130 and conforms to the communications protocol TCP/IP. Therefore, the projector 134 can receive the operation control command CODR and the operating status request command MOSR from any of the PCs and transmit the operating status data MODA to any Qf the PCs.

On the other hand, the network 130 may be a closed network that is controlled by a host computer and the like. In the closed network, the restriction for security is imposed on the terminal device such as the computer connected to the network 130 and the connection of computer nodes that are not subject to the control is inhibited.

A method of providing communication between a PC and a projector located on the network using the system for controlling projectors using the network 130 will now be described.

Initially, a desired projector to be controlled is selected by an arbitrary PC on the network. The projectors on the network which conform to the communications protocol TCP/IP are allocated with respective IP addresses. Accordingly, by assigning an IP address allocated to a particular projector, the projector to be controlled can be specified. By assigning a plurality of IP addresses, a plurality of projectors can be chosen as being controlled.

In the manner mentioned above, a desired projector to be controlled (a projector 134, for example) is selected by a PC (a PC 131, for example). The projector 134 has the same construction as that of the above-described projector 101 (FIG. 14). As mentioned previously in connection with the ninth embodiment, when the PC transmits an operating status request command MOSR to the projector 134, the projector 134 (FIG. 15) receives the operating status request command MOSR through the NW interface section 102 located therein. Then the microcomputer 103 of the projector 134 reads the operating status data MODA from the memory 105 in accordance with the requirements of the operating status request command and the projector 134 transmits the operating status data MODA to the PC 131 through the NW interface section 102, the network 130, and so on.

The transmission and reception of the operation control command CODR and/or abnormality notification data ABDA can be performed in the similar as mentioned in the ninth embodiment. The tenth embodiment is the same as the ninth embodiment in the exception that the route includes the network 130. The method of centralized-controlling projectors according to the tenth embodiment is capable of controlling projectors on a network of a greater extent, in addition to the effects achieved by the ninth embodiment.

While the network 101 shown in connection with the ninth embodiment (FIG. 14) uses a bus network, a star network utilizing a hub and the like may also be used. Further, the projectors according to the ninth and/or tenth embodiment may be replaced with any of the projectors 1 to 5 according to the above-described first to fifth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A projector comprising:
    a main body forming a casing of the projector, the main body including therein:
    an optical engine which projects an image based on a video signal;
    a circuit section which controls operation of said optical engine;
    a power source which supplies electric power to said circuit section;
    a network interface, through which said circuit section communicates with a remote network terminal device; and
    a hub which is connected to said network interface, said hub including ports, said network interface being connected to said remote network terminal device through one of said ports, electric power from said power source being supplied to said hub.

2. The projector according to claim 1, wherein said circuit section causes said optical engine to project an image regarding information of said remote network terminal device connected to said hub.

3. The projector according to claim 1, wherein said circuit section causes said optical engine to project an image based on a video signal input to said circuit section.

4. The projector according to claim 1, further comprising an operating section, through which an operator inputs to said circuit section a command for selecting a video signal to be projected from video signals input to said ports of said hub.

5. The projector according to claim 1, wherein said hub is a switching hub.

* * * * *